United States Patent
Yamasaki et al.

(10) Patent No.: US 8,214,368 B2
(45) Date of Patent: Jul. 3, 2012

(54) DEVICE, METHOD, AND COMPUTER-READABLE RECORDING MEDIUM FOR NOTIFYING CONTENT SCENE APPEARANCE

(75) Inventors: Tomohiro Yamasaki, Tokyo (JP); Takahiro Kawamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 589 days.

(21) Appl. No.: 12/234,728

(22) Filed: Sep. 22, 2008

(65) Prior Publication Data

US 2009/0248637 A1 Oct. 1, 2009

(30) Foreign Application Priority Data

Mar. 27, 2008 (JP) .................. 2008-084604

(51) Int. Cl.
*G06F 17/30* (2006.01)
(52) U.S. Cl. ...................................... 707/739
(58) Field of Classification Search .................. None
See application file for complete search history.

(56) References Cited

U.S. PATENT DOCUMENTS

| | | | |
|---|---|---|---|
| 6,714,909 B1 * | 3/2004 | Gibbon et al. ............... | 704/246 |
| 2007/0033531 A1 * | 2/2007 | Marsh ........................... | 715/738 |
| 2007/0143493 A1 * | 6/2007 | Mullig et al. ................ | 709/232 |
| 2010/0199295 A1 * | 8/2010 | Katpelly et al. ............. | 725/14 |

FOREIGN PATENT DOCUMENTS

JP 2005-323090 11/2005

OTHER PUBLICATIONS

Sano, Masanori; Hideki Sumiyoshi; Mashiro Shibata; Nobuyuki Yaga; "Generating Metadata from Acoustic and Speech Data in Live Broadcasting", 2005, IEEE, pp. II-11451148.*
Explanatory-Description Adding Apparatus, Computer Program Product, and Explanatory-Description Adding Method, Pending U.S. Appl. No. 12/049,767.

* cited by examiner

*Primary Examiner* — Sathyanarayan Pannala
*Assistant Examiner* — Dinku Gebresenbet
(74) *Attorney, Agent, or Firm* — Turocy & Watson, LLP

(57) ABSTRACT

An extracting unit extracts keywords from metadata extracted from played scenes. An attaching unit attaches a semantic class to the keywords. A semantic class determining unit determines whether the semantic class is a should-be-played class. When there is a keyword with the should-be-played class attached, an acquiring unit acquires at least one keyword without having the should-be-played class as a should-be-observed keyword. When the metadata includes the should-be-observed keyword and a keyword to which a should-be-stopped class is attached, an appearance determining unit determines that a scene including the should-be-observed keyword appears in contents.

13 Claims, 9 Drawing Sheets

FIG.2

| KEYWORD | SEMANTIC CLASS | CERTAINTY |
|---|---|---|
| IGUANA<br>FINALLY<br>ENOKIDAKE<br>MUSHROOM<br>BIG-NAME<br>SINGER<br>... | ANIMAL, REPTILE<br>TIME, NEAR FUTURE<br>PLANT, FUNGUS<br>EXAGGERATION<br>STATUS, OCCUPATION<br>...  | 100<br>50<br>100<br>80<br>100<br>... |

FIG.3

| CONDITION | SEMANTIC CLASS | CERTAINTY |
|---|---|---|
| XXSAN, XXSHI<br>XXKEN, XXSHI<br>XXBYO<br>XXYOTEI<br>XXNO ATO<br>XXDESHITA<br>... | PERSON<br>PLACE NAME, JAPANESE CITY<br>HEALTH, NAME OF DISEASE<br>TIME, NEAR FUTURE<br>TIME, NEAR FUTURE<br>TIME, PAST<br>... | 80<br>100<br>100<br>80<br>80<br>80<br>... |

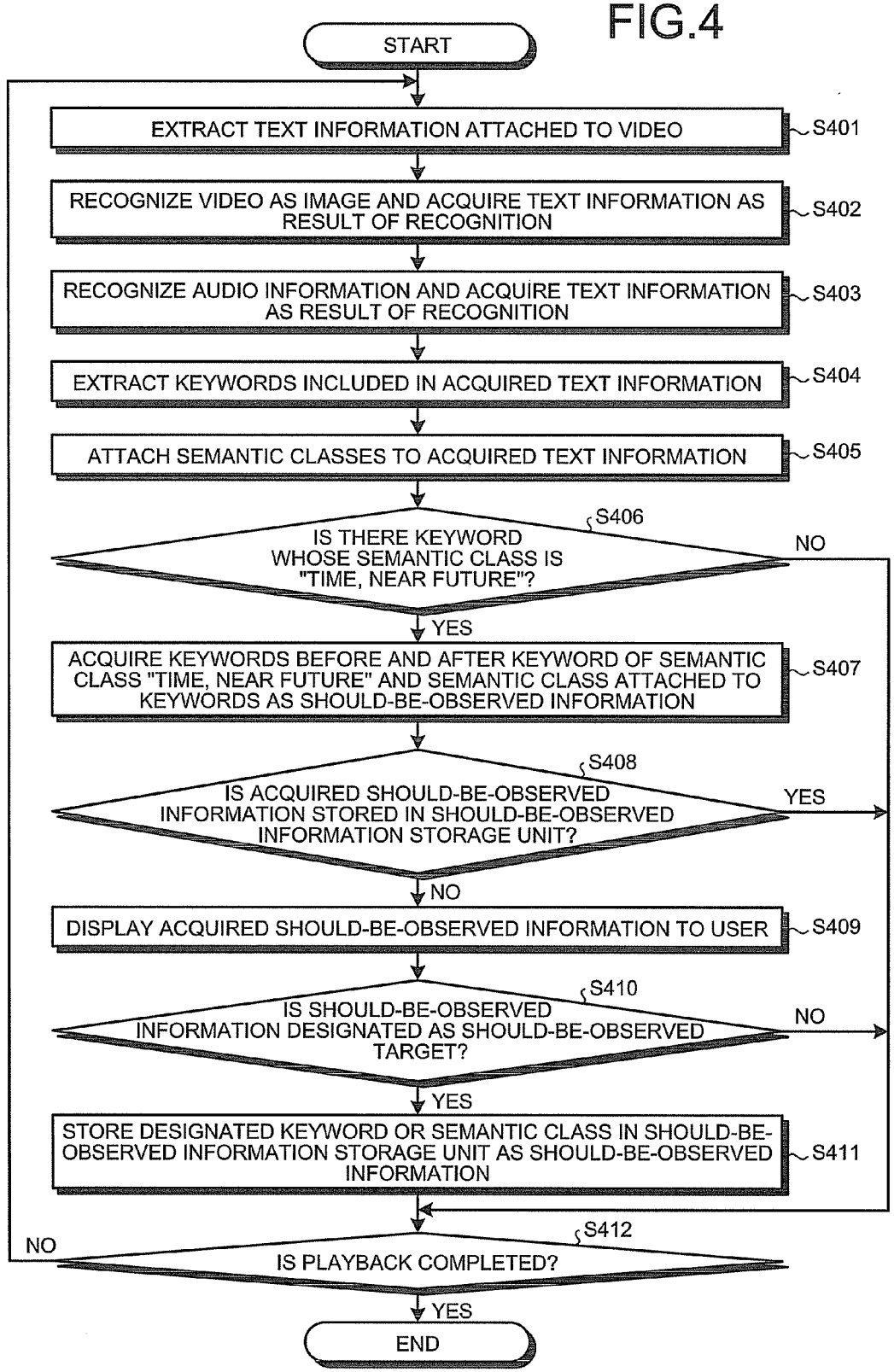

FIG.5

| TIME | SUBTITLE INFORMATION |
|---|---|
| ... | ... |
| 21:28:28 | WHEN YAMAMOTO-SAN SAYS THAT, HOW COULD SHIMA-SAN RESPOND? |
| 21:28:34 | THIS IS BECAUSE I HAD AN IGUANA AT HOME. |
| 21:28:38 | SO YOU NEED A LIGHT, DON'T YOU? |
| 21:28:41 | IT'S AN IGUANA, THE LIZARD, YES? IT REQUIRES A LIGHT. |
| ... | ... |
| ... | ... |
| 21:29:32 | THIS IS THE PRIZE YOU CAN WIN. |
| 21:29:42 | WHAT'S THE LEVEL OF CONFIDENCE ABOUT YOUR ANSWER? |
| 21:29:54 | MORI-SAN DID GOOD. |
| 21:29:57 | THE ANSWER WILL BE GIVEN RIGHT AFTER COMMERCIALS. |
| ... | ... |

FIG.6

| KEYWORD | SEMANTIC CLASS |
|---|---|
| KEYWORD | PERSON, CELEBRITY |
| YAMAMOTO-SAN | PERSON, CELEBRITY |
| SHIMA-SAN | ANIMAL, REPTILE |
| IGUANA | INANIMATE OBJECT, DAILY-USE PRODUCT |
| LIGHT | |
| LIZARD | ANIMAL, REPTILE |
| PRIZE | INANIMATE OBJECT, GIFT |
| LEVEL OF CONFIDENCE | NUMERALS |
| ANSWER | INTANGIBLE OBJECT |
| AFTER COMMERCIALS | TIME, NEAR FUTURE |

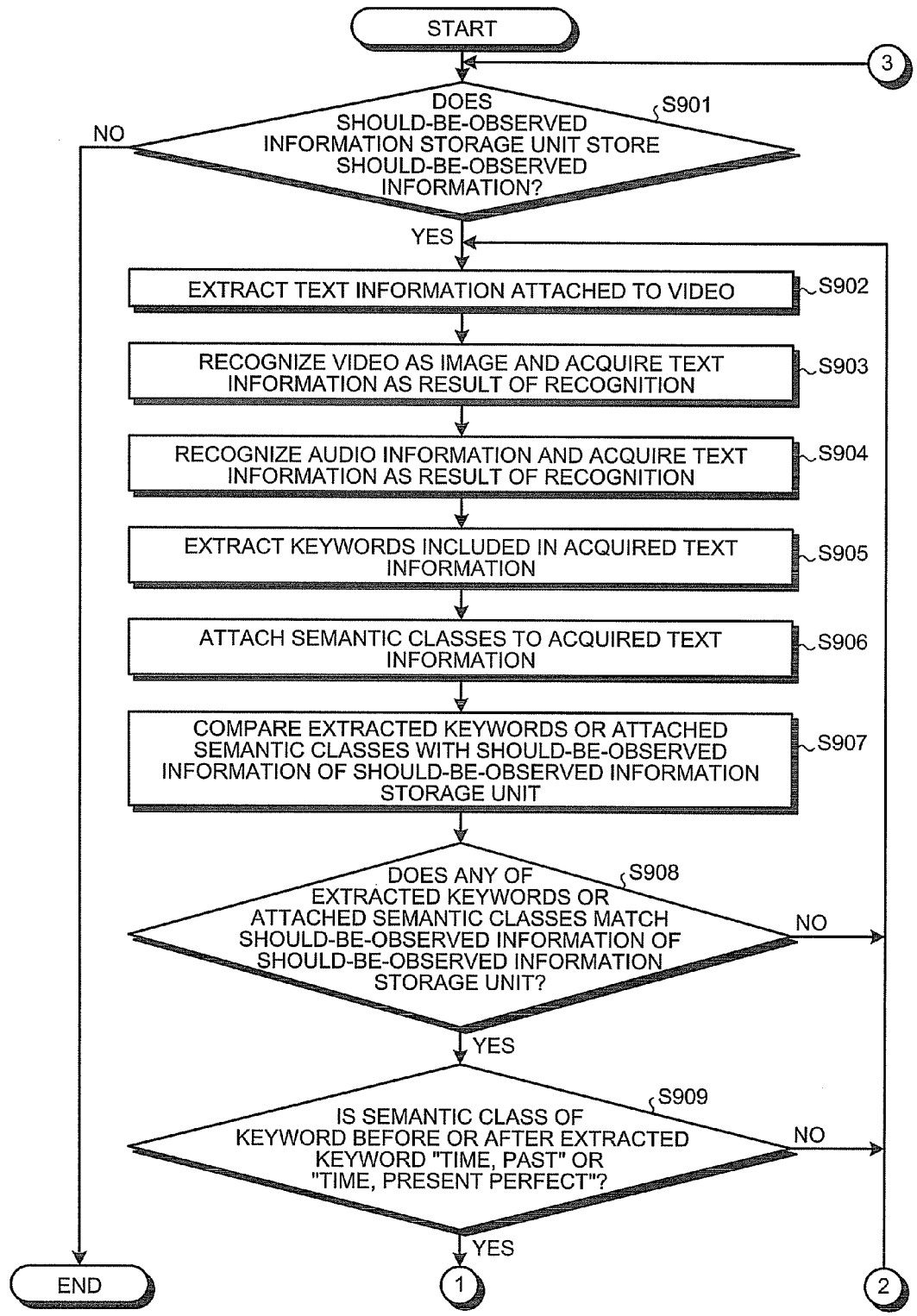

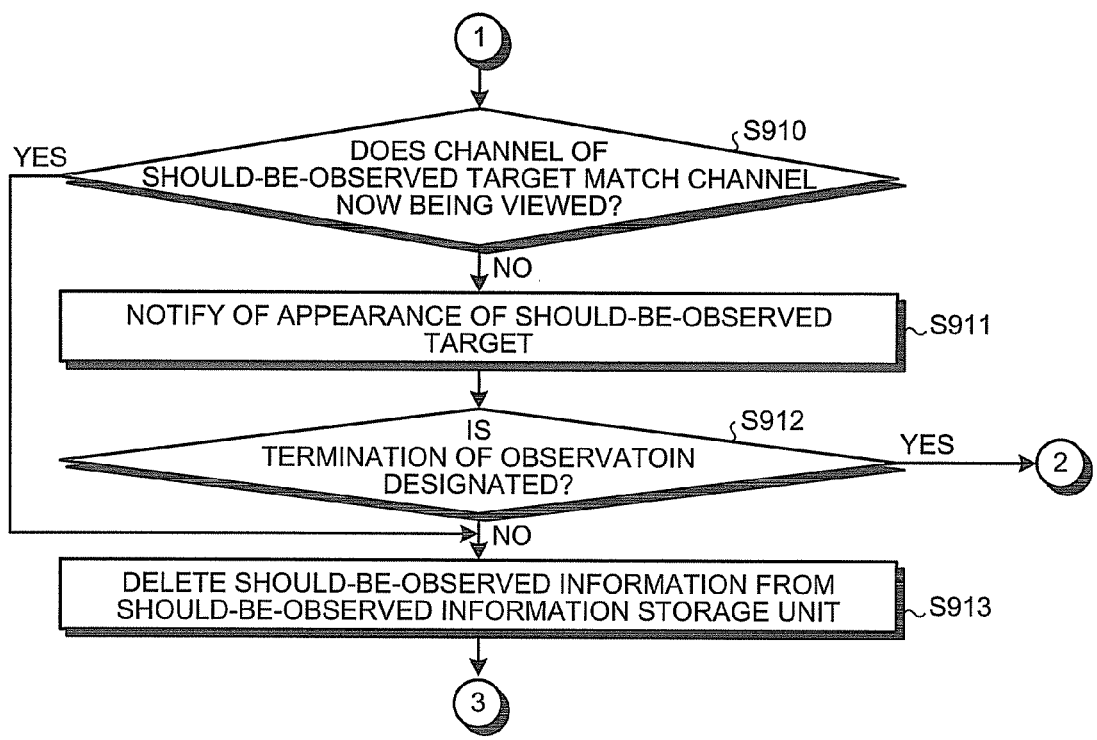

DEVICE, METHOD, AND COMPUTER-READABLE RECORDING MEDIUM FOR NOTIFYING CONTENT SCENE APPEARANCE

CROSS-REFERENCE TO RELATED APPLICATIONS

This application is based upon and claims the benefit of priority from the prior Japanese Patent Application No. 2008-84604, filed on Mar. 27, 2008; the entire contents of which are incorporated herein by reference.

BACKGROUND OF THE INVENTION

1. Field of the Invention

The present invention relates to a device, a method, and a computer-readable recording medium for notifying a user that an object of interest appears on a scene when watching a television program or any other video contents, thereby realizing an effective viewing.

2. Description of the Related Art

Recently, television programs often make announcements such as "X appears soon" and "Y comes on right after this" to give the viewers advance notice regarding the appearance of an object of interest. Such announcements are made in an effort to keep the viewers stay with the program without changing the channel. Even after the announcements, it usually takes a while for the objects X and Y to actually appear onto the scene. For this reason, the viewers may have to watch the television by (1) being forced to stay with unwanted scenes although the desired scene could be very short; (2) changing the channel to view another program while frequently checking the previous channel; or (3) recording the program and viewing it later.

Operations (1) and (2) waste time and give the user labor of checking. As for operation (2), if the user likes the program on the channel that has been changed to, the user may miss the scene of the desired object on the previous channel. In operation (3), the user can view the program later, which minimizes the risk of missing the desired scene. However, if the user wants to watch, for example, a quiz show in ease, a recording operation may give the user a burden. Furthermore, the user may not want to record live broadcasting of a sport game or the like but simply want to obtain in-progress game reports. With the conventional technologies, the efficiency of television viewing may be reduced.

Some technologies (for example, JP-A 2005-323090 (KO-KAI)) suggest methods of detecting and notifying the viewer of a desired scene so that the viewer can view the scene without missing. According to the method offered by JP-A 2005-323090 (KOKAI), scene specifying keywords entered by the viewer are compared with broadcast data (transport stream) in which scene information that identifies a scene is superimposed on each scene of a program to detect a desired scene in the program.

The method of JP-A 2005-323090 (KOKAI), however, is predicated on the scene information that is superimposed on the broadcast data. This means that scene information needs to be added to every scene of every program of every broadcast station to realize the notification of any desired scene for any program of any station, which is very difficult. In place of scene information that identifies scenes, subtitles may be incorporated. However, subtitle information may not always accurately identify scenes. Even when a keyword that indicates the object of the viewer's interest appears in the subtitles, it may take a while for the object corresponding to the keyword to actually appear onto the scene, as previously mentioned. Therefore, in the conventional technologies, there is a possibility of notifying the viewer of a wrong scene as the one in which the object of interest actually appears when the object has not yet appeared.

SUMMARY OF THE INVENTION

According to one aspect of the present invention, there is provided a device for notifying a scene. The device includes a playing unit that plays contents including plural scenes that can be played in time sequence; a metadata extracting unit that extracts metadata that is text information on the scenes from played scenes; a keyword extracting unit that extracts keywords from the metadata; an attaching unit that attaches a semantic class indicating a semantic attribute of a keyword to each of the keywords; a semantic class determining unit that determines whether the semantic class attached to the keyword is a should-be-played class indicating that playback is performed after a scene from which the keyword is extracted; an acquiring unit that, when there is a keyword to which the semantic class determining unit determines that the should-be-played class is attached, acquires at least one keyword that is not provided with the should-be-played class as a should-be-observed keyword from among the keywords to which the semantic classes are attached; an appearance determining unit that, when the metadata extracted from a scene that is played after a scene from which the should-be-observed keyword is extracted includes the should-be-observed keyword and a keyword to which a should-be-stopped class that is a semantic class indicating that playback is completed is attached, determines that a scene including the should-be-observed keyword appears in contents that are being played; and a notifying unit that, when the scene including the should-be-observed keyword appears, makes a notification that the scene including the should-be-observed keyword appears.

Furthermore, according to another aspect of the present invention, there is provided a method of notifying a scene. The method includes playing contents including plural scenes that can be played in time sequence; extracting metadata that is text information on the scenes from played scenes; extracting keywords from the metadata; attaching a semantic class indicating a semantic attribute of a keyword to each of the keywords; determining whether the semantic class attached to the keyword is a should-be-played class indicating that playback is performed after a scene from which the keyword is extracted; acquiring, when there is a keyword to which the semantic class determining unit determines that the should-be-played class is attached, at least one keyword that is not provided with the should-be-played class as a should-be-observed keyword from among the keywords to which the semantic classes are attached; determining, when the metadata extracted from a scene that is played after a scene from which the should-be-observed keyword is extracted includes the should-be-observed keyword and a keyword to which a should-be-stopped class that is a semantic class indicating that playback is completed is attached, that a scene including the should-be-observed keyword appears in contents that are being played; and notifying, when the scene including the should-be-observed keyword appears, that the scene including the should-be-observed keyword appears.

Moreover, according to still another aspect of the present invention, there is provided a computer-readable recording medium that stores therein a computer program for notifying a scene. The computer program causes a computer to execute playing contents including plural scenes that can be played in time sequence; extracting metadata that is text information on the scenes from played scenes; extracting keywords from the metadata; attaching a semantic class indicating a semantic attribute of a keyword to each of the keywords; determining whether the semantic class attached to the keyword is a should-be-played class indicating that playback is performed after a scene from which the keyword is extracted; acquiring, when there is a keyword to which the semantic class determining unit determines that the should-be-played class is attached, at least one keyword that is not provided with the should-be-played class as a should-be-observed keyword from among the keywords to which the semantic classes are attached; determining, when the metadata extracted from a scene that is played after a scene from which the should-be-observed keyword is extracted includes the should-be-observed keyword and a keyword to which a should-be-stopped class that is a semantic class indicating that playback is completed is attached, that a scene including the should-be-observed keyword appears in contents that are being played; and notifying, when the scene including the should-be-observed keyword appears, that the scene including the should-be-observed keyword appears.

BRIEF DESCRIPTION OF THE DRAWINGS

FIG. 2 is a diagram for showing an example data structure of dictionary information stored in a dictionary storage unit;

FIG. 3 is a diagram for showing another example data structure of the dictionary information stored in the dictionary storage unit;

FIG. 4 is a flowchart of the entire monitor information extracting process according to the embodiment;

FIG. 5 is an example of subtitle information that is superimposed on video contents and distributed to viewers;

FIG. 6 is an example of keywords to which semantic classes are attached;

FIGS. 9A and 9B are flowcharts of the entire scene notifying process according to the embodiment;

DETAILED DESCRIPTION OF THE INVENTION

Exemplary embodiments of a device, a method, and a program of the present invention are explained in detail below with reference to the attached drawings.

The scene notifying device according to the present embodiment extracts text information metadata from a scene of contents; picks up, from among keywords in the metadata, keywords placed before or after a keyword to which a semantic class indicating near future is attached; and determines the picked-up keywords as keywords that are to be observed (should-be-observed keywords). When a should-be-observed keyword is detected in a scene played later than the scene from which the metadata is extracted, and also when there is, before and after the should-be-observed keyword, any keyword to which a semantic class indicating a past tense or a present perfect tense is attached, it is determined that the object corresponding to the should-be-observed keyword shows up.

Figure 1:
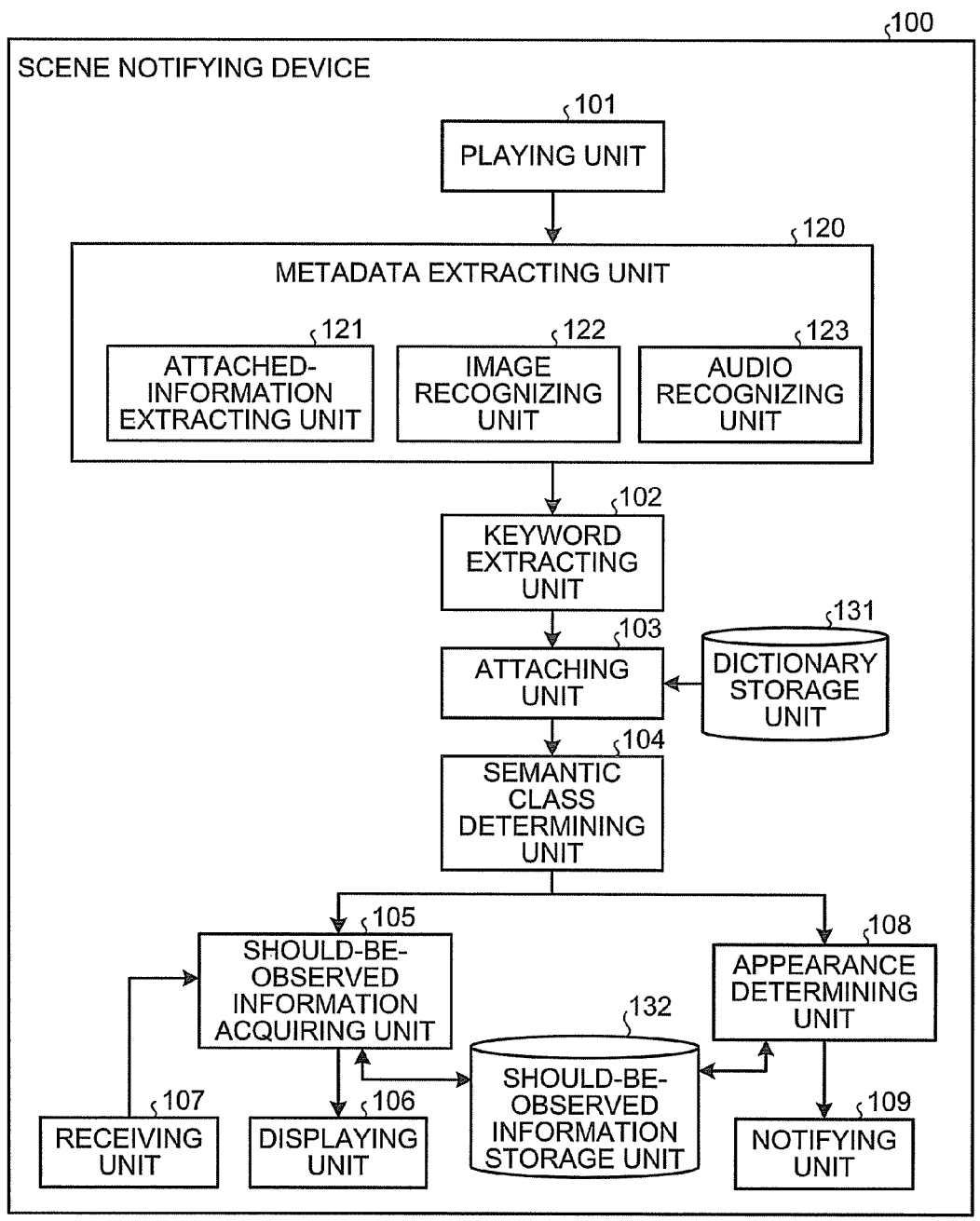
FIG. 1 is a block diagram for showing the structure of a scene notifying device according to an embodiment of the present invention.

In the structure of FIG. 1, a scene notifying device 100 includes a playing unit 101, a metadata extracting unit 120, a dictionary storage unit 131, a keyword extracting unit 102, an attaching unit 103, a semantic class determining unit 104, a should-be-observed information acquiring unit 105, a should-be-observed information storage unit 132, a displaying unit 106, a receiving unit 107, an appearance determining unit 108, and a notifying unit 109.

The playing unit 101 plays contents containing plural scenes, such as a television broadcast. It should be noted that the contents are not limited to television broadcasts and that any types of contents can be incorporated as long as metadata for each of the scenes included in the contents can be extracted as text information. For example, video contents stored in a recording medium such as a digital versatile disk (DVD) and audio contents such as a radio broadcast may be incorporated. In the following explanation, playback of video contents distributed as a television broadcast is used as an example.

The metadata extracting unit 120 extracts metadata for each scene of the video contents distributed through television broadcasting from a broadcast wave of the video contents. The metadata extracting unit 120 includes an attached-information extracting unit 121, an image recognizing unit 122, and an audio recognizing unit 123.

The attached-information extracting unit 121 extracts, as metadata, attached-information that is text information such as an electronic program guide (EPG), a data broadcast, and subtitles that are superimposed on the television broadcast video contents.

The image recognizing unit 122 recognizes image information, such as a person and a building, and telops in the video contents, and extracts, as metadata, text information representing the recognized image information and telops.

The audio recognizing unit 123 recognizes audio information contained in the video contents, such as utterance, music, and sound effects, and extracts, as metadata, text information representing the recognized utterance, the title of the music piece, or the type of sound effects.

The dictionary storage unit 131 stores therein dictionary information that is used to acquire a semantic class indicating the semantic attribute of a keyword contained in the metadata. As shown in FIG. 2, the dictionary information includes keywords, the semantic classes of the keywords, and the certainty factors of the semantic classes that indicate the certainty of the semantic classes. The semantic classes include time-associated classes such as near future, past, and present perfect, name-associated classes such as names of physical entities such as people and places, and exaggeration-associated classes.

The dictionary information is referred to when the keyword extracting unit 102, which will be discussed later, extracts a keyword from the metadata or when the attaching unit 103, which will also be discussed later, attaches a semantic class to the extracted keyword.

The data structure of the dictionary information is not limited to the structure illustrated in FIG. 2, but any data structure can be adopted for the dictionary information as long as the semantic classes of keywords in the text information of the metadata or the like can be determined by use of the dictionary information. In the example of FIG. 3, the dictionary information includes conditions defining rules for arrangements of character strings and morphemes, semantic classes, and certainty factors that are brought into association with one another. With such dictionary information, a keyword that satisfies a condition can be extracted from given text information, and also a semantic class that corresponds to the extracted keyword can be attached to the extracted keyword.

The keyword extracting unit 102 extracts from the extracted metadata a keyword that matches one of the keywords in the dictionary information stored in the dictionary storage unit 131. The keyword extraction is not limited to this method, but the structure may be such that the metadata is morphologically analyzed so that a keyword obtained as a result of the analysis is extracted.

The attaching unit 103 attaches a corresponding semantic class of the dictionary information to each of the keywords extracted by the keyword extracting unit 102.

The process in which the keyword extracting unit 102 extracts the keywords from the metadata and the attaching unit 103 attaches a semantic class to each of the extracted keywords is the same as execution of a metadata semantic analyzing process. The semantic analyzing process may be conducted by finding a match from among given keywords as illustrated in FIG. 2, or by finding a match from among given conditions as illustrated in FIG. 3.

For a keyword that has multiple meanings, different semantic classes may be acquired from the dictionary information. For example, "Kawasaki" can be a name of a person and a name of a place. In such a case, all the acquired semantic classes can be used as they are. However, for the sake of the user's convenience, it is preferable to narrow down to one semantic class by choosing either the semantic class with the greatest certainty factor or the semantic class closest to the semantic classes of adjacent keywords.

The semantic class determining unit 104 determines whether there is, among the keywords extracted by the keyword extracting unit 102, any keyword to which a semantic class of should-be-played indicating the playback performed after the keyword-extracted scene is attached. For instance, the should-be-observed information acquiring unit 105 determines whether there is any keyword to which a semantic class indicating near future is attached as a should-be-played class.

When it is determined that there is a keyword to which the should-be-played class is attached among the extracted keywords, the should-be-observed information acquiring unit 105 acquires keywords placed before and after the keyword of interest as should-be-observed keywords. Furthermore, the should-be-observed information acquiring unit 105 acquires the semantic classes of the acquired keywords before and after the keyword of interest as should-be-observed classes. In the following explanation, the should-be-observed keywords and should-be-observed classes may be referred to as should-be-observed information.

In other words, the should-be-observed information acquiring unit 105 can acquire not only keywords but also semantic classes as targets under observation. This realizes accurate notification of a desired scene. For instance, when a message "big actor coming up soon" is output, the conventional technology allows for detection of a scene on which a keyword "big actor" appears, but not a scene on which the name of the actor actually appears. In contrast, according to the present embodiment, the semantic class "big actor" can be observed. Thus, if there is any dictionary information item that indicates a name of a person associated with the semantic class "big actor", a scene on which this name actually appears can be detected.

It should be noted that the should-be-observed information acquiring unit 105 acquires, as should-be-observed keywords, any keywords other than the selected keyword from among the keywords extracted from one scene. The should-be-observed information acquiring unit 105 may be configured in such a manner as to analyze the modification relation of the keywords extracted from a scene and acquire keywords having a modification relation with the selected keyword as should-be-observed keywords.

The displaying unit 106 displays the should-be-observed information acquired by the should-be-observed information acquiring unit 105 to inquire about whether to actually put the should-be-observed information under observation. An example of the display screen showing the should-be-observed information will be discussed later.

The receiving unit 107 receives a keyword designated by the user by checking the display screen so that the keyword would be put under watch. For example, the receiving unit 107 receives, from among the displayed should-be-observed keywords, a should-be-observed keyword selected with a remotely controlled cursor.

The should-be-observed information storage unit 132 stores therein the designated should-be-observed information received by the receiving unit 107. The should-be-observed information storage unit 132 associates identification information of the target video contents such as a channel ID of a television broadcast with the should-be-observed information, in such a manner as (should-be-observed keyword, channel ID) and (should-be-observed class, channel ID).

The dictionary storage unit 131 and the should-be-observed information storage unit 132 may be realized by any recording medium that is commonly used, such as a hard disk drive (HDD), a magneto-optical (MO) disk, a memory card, and a random access memory (RAM).

The appearance determining unit 108 determines whether the should-be-observed information stored in the should-be-observed information storage unit 132 appears in the contents that are sequentially played. More specifically, the appearance determining unit 108 determines whether the metadata extracted from a scene played after the storage operation of the should-be-observed information includes the should-be-observed information, and also whether a should-be-stopped class that is a semantic class indicating the completion of playback is attached to the keywords placed before and after the should-be-observed information. When the metadata extracted from a scene played after the storage operation of the should-be-observed information includes the should-be-observed information, and also when a should-be-stopped class is attached to the keywords placed before and after the should-be-observed information, the appearance determining unit 108 determines that a scene containing the should-be-observed information appears. For the should-be-stopped class, a semantic class indicating a past or present perfect tense may be adopted.

More specifically, when the should-be-observed information is a should-be-observed keyword, the appearance determining unit 108 determines whether the keywords in the metadata extracted from the played scene include the should-be-observed keyword and also whether the should-be-stopped class is attached to the keywords before and after the keyword that matches the should-be-observed keyword. When the should-be-observed information is a should-be-observed class, the appearance determining unit 108 determines whether the keywords in the metadata extracted from the played scene include a keyword to which the should-be-observed class is attached and also whether the should-bestopped class is attached to the keywords before and after this keyword to which the should-be-observed class is attached.

The notifying unit 109 notifies the user that a scene containing the should-be-observed information appears when the appearance determining unit 108 made the determination. For example, the notifying unit 109 displays a scene containing the should-be-observed information on the displaying unit 106 to notify the viewer of the appearance of the scene. The manner of the notifying unit 109 making a notification will be described later.

The should-be-observed information extracting process performed by the scene notifying device 100 configured in the above manner according to the present embodiment is explained below with reference to FIG. 4. In the should-be-observed information extracting process, the should-be-observed information is extracted from the contents that are being played and stored in the should-be-observed information storage unit 132.

The should-be-observed information extracting process is initiated when, for example, the user starts viewing a television broadcast. First, when the broadcast video contents are played, the attached-information extracting unit 121 of the metadata extracting unit 120 extracts, as metadata, attached-information distributed in such a manner as to be superimposed on the video contents such as an EPG, data broadcast, and subtitles (Step S401).

In FIG. 5, an example of subtitles for a conversation about an iguana broadcasted on a certain channel between the times 21:28:00 and 21:30:00 is provided.

In FIG. 4, the image recognizing unit 122 recognizes the image of every scene of the video contents, and extracts therefrom as metadata, text information of a person, a building, or a telop obtained as a result of the recognition (Step S402). Furthermore, the audio recognizing unit 123 recognizes the audio information contained in the video contents, and extracts therefrom as metadata, text information of an utterance, the title of a music piece, or a type of sound effects obtained as a result of the recognition (Step S403).

The operations at Steps S401 to S403 do not have to be performed in this order. The processes may be performed in any order, or in parallel.

Next, the keyword extracting unit 102 extracts keywords from the acquired text information (metadata) (Step S404). For example, the keyword extracting unit 102 extracts, from the metadata, a keyword that matches one of the keywords included in the dictionary information as shown in FIG. 2.

Then, the attaching unit 103 attaches a semantic class to each of the extracted keywords (Step S405). For example, the attaching unit 103 acquires a semantic class that corresponds to an extracted keyword from the dictionary information as shown in FIG. 2, and attaches it to the keyword.

FIG. 6 is a diagram showing a list of keywords with semantic classes attached thereto, which is obtained as a result of a semantic analysis of the subtitle information of FIG. 5 by use of the dictionary information. In FIG. 6, to the keywords "Yamamoto-san" and "Shima-san", which are considered to be names of the people who are in the program, a semantic class "person, celebrity" is attached. To the keywords "iguana" and "lizard", a semantic class "animal, reptile" is attached.

In FIG. 4, the semantic class determining unit 104 determines whether there is any keyword to which a semantic class "time, near future" is attached (Step S406). When there is any (Yes at Step S406), the should-be-observed information acquiring unit 105 acquires, as should-be-observed keywords, keywords placed before and after the keyword to which the semantic class "time, near future" is attached, and, as should-be-observed classes, the semantic classes attached to these keywords (Step S407).

Next, the should-be-observed information acquiring unit 105 determines whether the acquired should-be-observed information (should-be-observed keywords or should-be-observed classes) has been stored in the should-be-observed information storage unit 132 (Step S408). When no should-be-observed information is yet stored (No at Step S408), the should-be-observed information acquiring unit 105 provides the user with the acquired should-be-observed information (Step S409). The should-be-observed information acquiring unit 105 may present the should-be-observed information on the display screen of the displaying unit 106 to provide the user with the acquired should-be-observed information.

Figure 7:
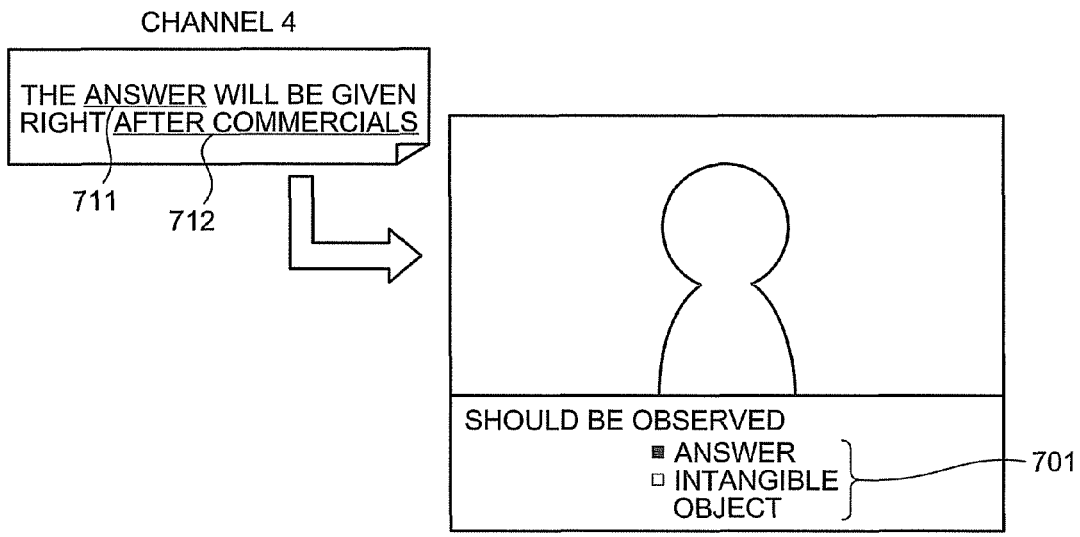
FIG. 7 is a diagram showing an example display screen presenting should-be-observed information.

In FIG. 7, an example of should-be-observed information 701 displayed beneath the video contents is illustrated. The displaying manner is not limited to this, and the should-be-observed information may be displayed in any other position on the screen.

In the example of FIG. 7, a keyword 712 ("answer") placed before a keyword 711 ("after commercials") to which a semantic class indicating the should-be-played, "time, near future", is attached is acquired as a should-be-observed keyword. In addition, a semantic class "intangible object" attached to this should-be-observed keyword is acquired as a should-be-observed class. The acquired should-be-observed keyword and should-be-observed class are displayed as the should-be-observed information 701. The black square placed in front of the should-be-observed keyword in this drawing indicates that the should-be-observed keyword ("answer") in the should-be-observed information is designated by the user. Then, the should-be-observed keyword associated with the channel ID, "(answer, channel 4)", is stored in the should-be-observed information storage unit 132.

In FIG. 4, the receiving unit 107 determines whether the user designates the should-be-observed information to put under observation (Step S410). When the user has designated (Yes at Step S410), the receiving unit 107 receives the designated should-be-observed information, and stores it in the should-be-observed information storage unit 132 (Step S411).

When it is determined at Step S406 that there is no keyword to which the semantic class "time, near future" is attached (No at Step S406), when it is determined at Step S408 that the should-be-observed information has been stored in the should-be-observed information storage unit 132 (Yes at Step S408), when it is determined at Step S410 that the user has not designated the should-be-observed information to put under observation, or after the should-be-observed information is stored at Step S411, the playing unit 101 determines whether the playback of the video contents is completed (Step S412).

When it is not completed (No at Step S412), the playing unit 101 continues the playback of the video contents. Thereafter, the system returns to Step S401, where the process is repeated by extracting metadata from a newly played scene. When the playback of the video contents is completed (Yes at Step S412), the should-be-observed information extracting process is terminated.

The should-be-observed information extracting process may be performed only when a predetermined action, such as the user's pressing a certain button on a remote control, is conducted. In this manner, the should-be-observed information is displayed only when the user desires.

When a different action, such as the user's pressing a different button, is executed, the should-be-observed information extracting process may be configured in such a manner that keywords and their semantic classes obtained at the time of execution of the action are extracted as should-be-observed information, regardless of the presence of a keyword to which the semantic class "time, near future" is attached.

Figure 8:
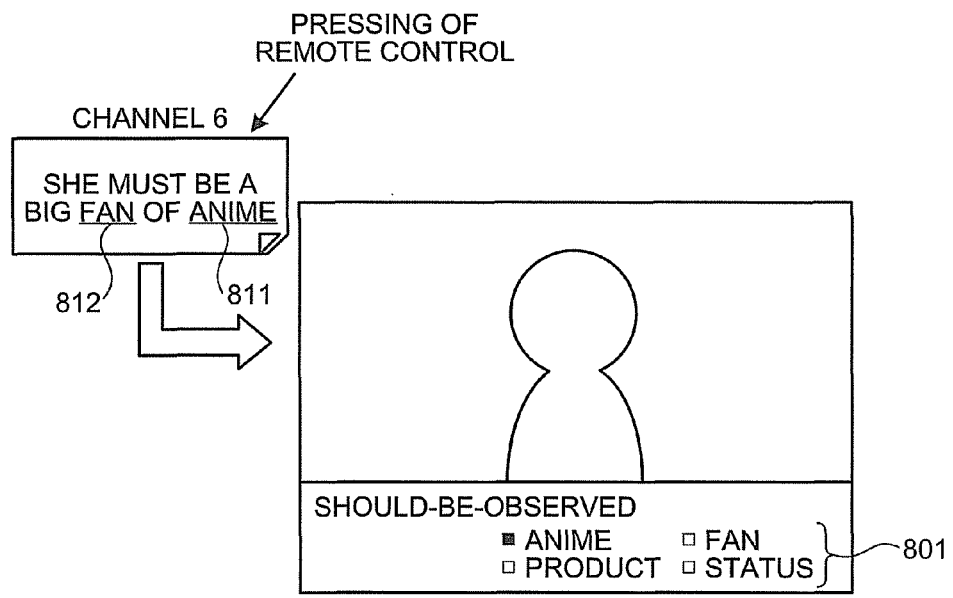
FIG. 8 is a diagram showing another example display screen presenting should-be-observed information.

FIG. 8 is a diagram for showing an example of the display screen presenting the should-be-observed information with the above structure. In response to the pressing of a remote control button, the keyword 811 ("ANIME") and the keyword 812 ("FAN") are acquired as should-be-observed keywords. Furthermore, the semantic classes attached to these should-be-observed keywords, "product" and "status", are acquired as should-be-observed classes. The acquired should-be-observed keywords and should-be-observed classes are displayed as should-be-observed information 801. When the keyword "ANIME" is designated, the should-be-observed keyword is brought into association with the channel ID, as a result of which "(ANIME, channel 6)" is stored in the should-be-observed information storage unit 132.

The scene notifying process performed by the scene notifying device 100 according to the present embodiment is explained below with reference to FIGS. 9A and 9B. In the scene notifying process, a scene in which the should-be-observed information appears is detected from the contents played after the should-be-observed information is stored, and the scene is notified of.

In the same manner as in the should-be-observed information extracting process, viewing of video contents such as a television broadcast is used as an example in the following explanation. However, any other types of contents may be incorporated as long as metadata for a scene can be extracted as text information.

First, the metadata extracting unit 120 determines whether the should-be-observed information is stored in the should-be-observed information storage unit 132 (Step S901). When no should-be-observed information is stored (No at Step S901), it means that there is nothing to should-be-observed. Thus, the scene notifying process is terminated.

When the should-be-observed information is stored (Yes at Step S901), the metadata extracting unit 120 extracts metadata from the video contents corresponding to a broadcast wave of the channel ID associated with the should-be-observed information (Steps S902 to S904).

The metadata may be extracted in parallel from all the broadcast waves of the channel IDs that can be received in a certain region. If the device does not have a sufficient metadata extracting capability, the number of targets under observation may be limited by displaying a warning message such as "no more targets under observation entered".

The metadata extracting process at Steps S902 to S904 and the semantic analyzing process at Steps S905 and S906 are the same as Steps S401 to S405 of the should-be-observed information extracting process. Thus, the explanation thereof is omitted.

After the semantic analyzing process, the appearance determining unit 108 compares the keyword extracted in the semantic analyzing process or the semantic class attached to this keyword with the should-be-observed information that is stored in the should-be-observed information storage unit 132 and includes a should-be-observed keyword or a should-be-observed class (Step S907).

Then, the appearance determining unit 108 determines whether the extracted keyword or the semantic class of the keyword matches the should-be-observed information in the should-be-observed information storage unit 132 (Step S908). When they do not match (No at Step S908), the metadata extracting process is repeated for the subsequently played scene (Step S902).

When there is a match (Yes at Step S908), the appearance determining unit 108 further determines whether the semantic class of the keyword extracted at a position before or after the extracted keyword is "time, past" or "time, present perfect" (Step S909).

In the example of FIG. 7, the keyword 712 ("answer") is stored as a should-be-observed keyword. Supposing that a scene to which subtitles or voice indicating "the answer has been . . . " is attached is played, a keyword "answer" that matches the should-be-observed keyword and a keyword "has been" that follows this keyword are extracted from the scene. The keyword "has been" is given the semantic class "time, present perfect" that indicates the completion of playback in accordance with the dictionary information of FIG. 3, for example. Thus, the appearance determining unit 108 determines that the semantic class of the keyword "has been" that follows the keyword that matches the should-be-observed keyword is "time, present perfect".

If the semantic class is neither "time, past" nor "time, present perfect" (No at Step S909), the metadata extracting process is repeated for the subsequently played scenes (Step S902). This is because the target indicated by the should-be-observed information is not considered to have appeared in the video contents.

If the semantic class is "time, past" or "time, present perfect" (Yes at Step S909), the appearance determining unit 108 determines that the target indicated by the should-be-observed information has appeared. Then, the appearance determining unit 108 determines whether the channel ID of the target under observation associated with the should-be-observed information matches the channel ID of the channel now being viewed (Step S910).

When the channel IDs do not match (No at Step S910), the notifying unit 109 notifies the user that a scene containing the should-be-observed information appears (Step S911). According to the present embodiment, a notification is given to the user only when the should-be-observed information appears in the metadata of the broadcast contents and when a keyword to which the semantic class indicating the completion of playback "time, past" or "time, present perfect" is attached is placed before or after the should-be-observed information.

Figure 10:
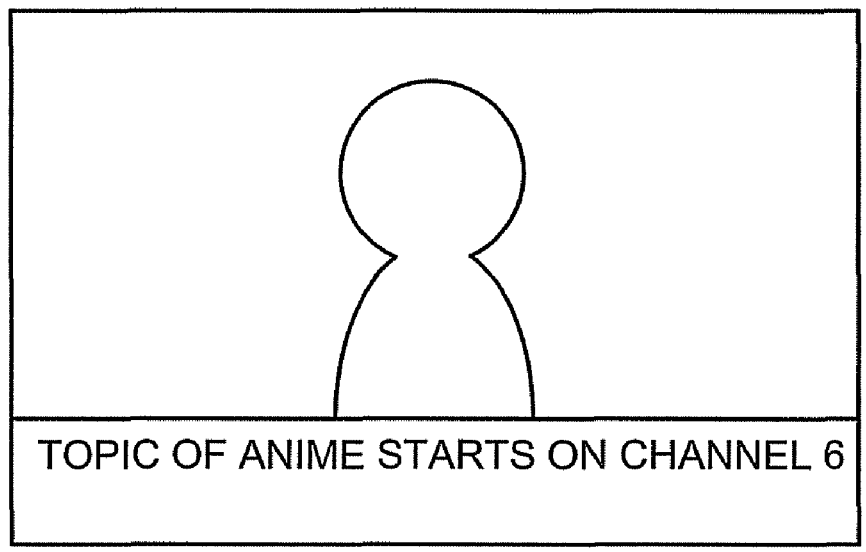
FIG. 10 is a diagram showing an example method of notifying the viewer of the appearance of a scene.
Figure 11:
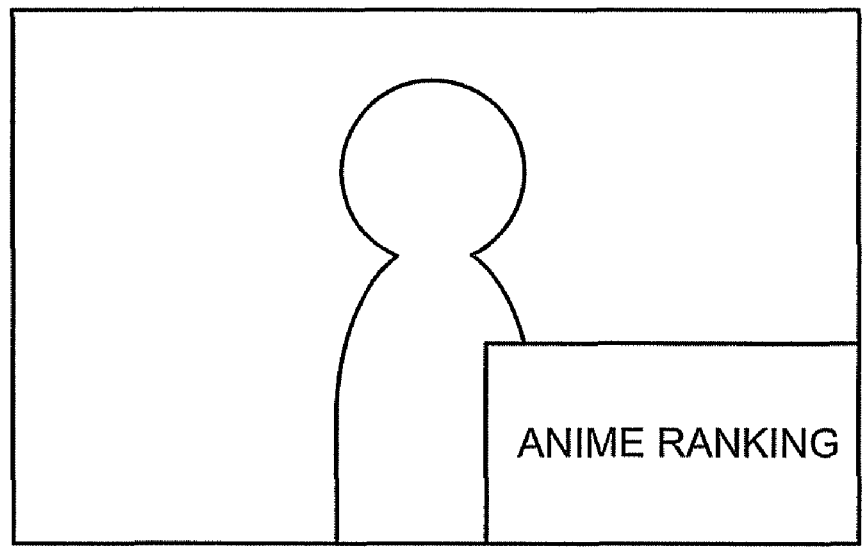
FIG. 11 is a diagram showing another example method of notifying the viewer of the appearance of a scene.
Figure 12:
FIG. 12 is a diagram showing still another example method of notifying the viewer of the appearance of a scene.

The notifying method performed by the notifying unit 109 is explained below. FIGS. 10 to 12 are diagrams for showing examples of methods with which the notifying unit 109 notifies the viewer of a scene.

In FIG. 10, at the bottom of the display screen on the channel currently being viewed, a message that a desired scene appears on a different channel ("a topic regarding ANIME starts on channel 6") is displayed.

FIG. 11 is a diagram for showing another notifying method with which video of a target under observation on a not-viewed channel is displayed at the lower right corner of the display screen on the channel currently being viewed. According to the notifying methods of FIGS. 10 and 11, the notification of the appearance of the target under observation can be made without interrupting the user's viewing the contents on a channel.

In the example of the notifying method of FIG. 12, the target under observation is notified of by automatically switching to the video of the channel on which the target under observation appears. The user can thereby effectively view the scene in which the target under observation appears, without missing it.

The structure may be configured in such a manner that the user can select a notifying method by presetting it on the system, or that the user can select one when setting a target under observation. Otherwise, the structure may be configured in such a manner that notifying methods are switched around in correspondence with the certainty factor of the semantic class.

In FIGS. 9A and 9B, after the notifying unit 109 notifies the user that the scene appears (Step S911), the receiving unit 107 determines whether the user designates the termination of the observation (Step S912). The termination of the observation may be determined in accordance with the pressing of a specific button of the remote control.

When the termination of the observation is not designated (No at Step S912), it means that a desired scene has not yet appeared. Thus, the system goes back to Step S902 to continue the observation. When the termination of the observation is designated (Yes at Step S912), the appearance determining unit 108 deletes the corresponding should-be-observed information from the should-be-observed information storage unit 132 (Step S913). Thereafter, the system goes back to Step S901. After determining whether any other should-be-observed information item is stored, the process is repeated.

When it is determined at Step S910 that the channel IDs match (Yes at Step S910), it means that the user is currently viewing the target under observation. The notifying unit 109 therefore does not make a notification. Then, the appearance determining unit 108 deletes the corresponding should-be-observed information from the should-be-observed information storage unit 132, and the system goes back to Step S901 to repeat the process.

The scene notifying device according to the present embodiment notifies the user of a scene when the should-be-observed information is detected in the metadata of the broadcast contents and only when a should-be-stopped class containing the semantic class of a tense such as past and present perfect is attached to a keyword placed before or after the should-be-observed information. As a result, a notification is not made when coming-up messages are repeatedly displayed but the target under observation has not yet appeared, while a notification is suitably made when the target actually appears.

The appearance of the target under observation is determined not only by comparing keywords but also by using semantic classes for targets under observation. Thus, even when, for example, a message "big actor coming up right after this" is output, a desired scene can be suitably detected and notified of to the user. With conventional technologies using keywords only, it has been difficult to realize such scene detection.

Figure 13:
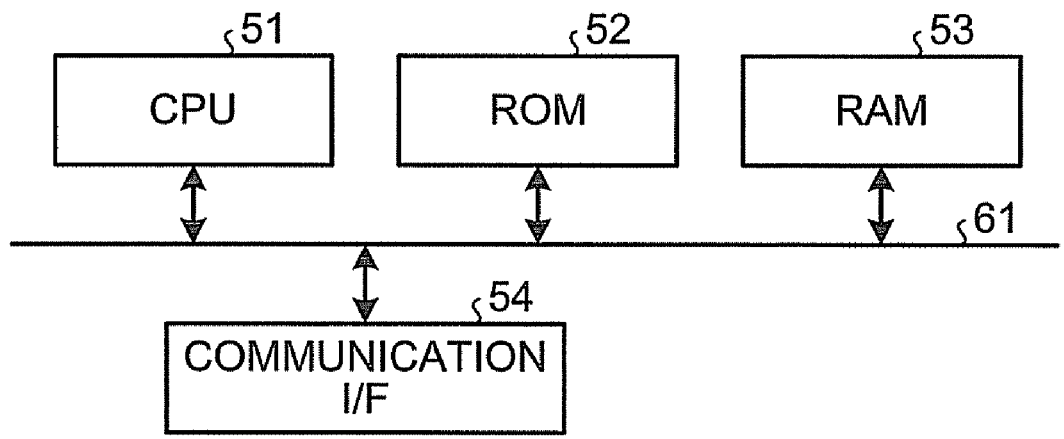
FIG. 13 is a diagram for explaining a hardware structure of the scene notifying device according to the embodiment.

Finally, the hardware structure of the scene notifying device according to the present embodiment is explained with reference to FIG. 13.

The scene notifying device according to the present embodiment has a hardware structure using a regular computer, including a control device such as a central processing unit (CPU) 51, storage devices such as a read only memory (ROM) 52 and a RAM 53, a communication interface (I/F) 54 connected to a network to perform communications, external storage devices such as an HDD and a compact disc (CD) drive, a display device, input devices such as a keyboard and a mouse, and a bus 61 connecting these components.

A scene notifying program executed by the scene notifying device according to the present embodiment is stored and provided in a computer-readable recording medium such as a compact disk read only memory (CD-ROM), a flexible disk (FD), a compact disk recordable (CD-R), and a digital versatile disk (DVD) in a file of an installable or executable format.

The scene notifying program executed by the scene notifying device according to the present embodiment may be stored in a computer connected to a network such as the Internet and downloaded via the network. The scene notifying program executed by the scene notifying device according to the present embodiment may be provided or distributed via a network such as the Internet.

The scene notifying program according to the present embodiment may be stored in a ROM in advance and provided in this manner.

The scene notifying program executed by the scene notifying device according to the present embodiment has a module structure including the above units (the playing unit, the metadata extracting unit, the keyword extracting unit, the attaching unit, the semantic class determining unit, the should-be-observed information acquiring unit, the receiving unit, the appearance determining unit, and the notifying unit). As an actual hardware structure, the CPU 51 (processor) reads the scene notifying program from the recording medium and executes the program so that the units are loaded and generated on the main storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A device for making a notification with respect to real-time-playing content at a time that a should-be-observed scene actually appears, comprising:
    a processor;
    a playing unit that plays a plurality of scenes that are played in time sequence, the scenes being included in content;
    a metadata extracting unit that extracts metadata from the played scenes, the metadata being text information on the scenes;
    a keyword extracting unit that extracts keywords from the metadata;
    an attaching unit that attaches a semantic class indicating a semantic attribute of a keyword to each of the keywords;
    a semantic class determining unit that determines whether the semantic class attached to the keyword is a should-be-played class that indicates that playback is to be performed after the scene from which the keyword is extracted;
    an acquiring unit that, in response to the keyword being attached to the should-be-played class, acquires at least one keyword as a should-be-observed keyword, wherein the at least one keyword is not attached with the should-be-played class and is from among the keywords to which semantic classes are attached;
    an appearance determining unit that, in response to the metadata extracted from a scene that is played after the scene from which the should-be-observed keyword is extracted includes the should-be-observed keyword and a keyword to which a should-be-stopped class has been attached, wherein the should-be-stopped class is a semantic class that indicates that playback is to be completed, determines that a scene including the should-be-observed keyword appears in content that is being played;
    a notifying unit that, in response to the scene including the should-be-observed keyword, notifies that an appearance of the scene that includes the should-be-observed keyword is appearing;

a displaying unit that displays acquired should-be-observed keywords; and a receiving unit that receives designations of the acquired should-be-observed keywords, wherein when the metadata that is extracted from a scene played after the scene from which the should-be-observed keywords are extracted includes a should-be-observed keyword for which the designation is received and the keyword to which the should-be-stopped class is attached, the appearance determining unit determines that the scene including the should-be-observed keyword appears in the content that is being played.

2. The device according to claim 1, wherein when there is a keyword to which the semantic class determining unit determines that the should-be-played class is attached, the acquiring unit acquires the semantic class of at least one keyword to which the semantic class is attached but to which the should-be-played class is not attached, the acquired semantic class being a should-be-observed class that is a semantic class to be observed, when the metadata extracted from the scene that is played after the scene from which the should-be-observed keyword is extracted includes a keyword to which the should-be-observed class is attached and a keyword to which the should-be-stopped class is attached, the appearance determining unit determines that a scene that includes a keyword of a semantic attribute indicated by the should-be-observed class appears in the content that are being played, and when it is determined that the scene that includes the keyword of the semantic attribute indicated by the should-be-observed class appears, the notifying unit notifies an appearance of the scene that includes the keyword of the semantic attribute indicated by the should-be-observed class.

3. The device according to claim 1, further comprising a dictionary storage unit that stores therein dictionary information of keywords and semantic classes associated with one another, wherein the keyword extracting unit extracts a keyword that matches a keyword in the dictionary information stored in the dictionary storage unit from the metadata, and the attaching unit attaches, to each of the extracted keywords, a semantic class corresponding to the keyword of the dictionary information that matches the each of the extracted keywords.

4. The device according to claim 3, wherein the dictionary information further includes certainty factors of the semantic classes associated with the keywords and the semantic classes, and the attaching unit attaches, to each of the extracted keywords, a semantic class having a maximum certainty factor among the semantic classes associated with the keywords of the dictionary information that match the extracted keywords.

5. The device according to claim 1, further comprising a dictionary storage unit that stores therein dictionary information of conditions that keywords satisfy and semantic classes associated with one another, wherein the keyword extracting unit extracts a keyword that satisfies a condition in the dictionary information stored in the dictionary storage unit from the metadata, and the attaching unit attaches, to the extracted keywords, a semantic class associated with the condition satisfied by an extracted keyword.

6. The device according to claim 5, wherein the dictionary information further includes certainty factors of the semantic classes, and the attaching unit attaches, to the extracted keywords, a semantic class having a maximum certainty factor from among the semantic classes corresponding to a condition that the extracted keyword satisfies.

7. The device according to claim 1, wherein the keyword extracting unit extracts keywords that appear in the metadata in a predetermined format, and the attaching unit attaches, to each of the keywords, a semantic class predetermined depending upon the format.

8. The device according to claim 1, wherein the playing unit plays the content including the scene to which the metadata is attached, and the metadata extracting unit extracts the metadata attached to the scene from the scene.

9. The device according to claim 1, wherein the playing unit plays video content that includes the scenes, which are image information, and the metadata extracting unit extracts text information obtained as a result of recognizing the image information as the metadata.

10. The device according to claim 1, wherein the playing unit plays video content including the scenes, which are image information, and audio information corresponding to the image information, and the metadata extracting unit recognizes the audio information and extracts text information obtained as a result of recognition as the metadata.

11. The device according to claim 1, wherein the playing unit plays audio content including the scenes, which is audio information, and the metadata extracting unit extracts text information obtained as a result of recognition of the audio information, as the metadata.

12. A method of making a notification with respect to real-time-playing content played at a time that a should-be-observed scene actually appears, comprising:

playing a plurality of scenes that are played in time sequence, the scenes being included in content;

extracting metadata from the played scenes, the metadata being text information on the scenes;

extracting keywords from the metadata;

attaching a semantic class indicating a semantic attribute of a keyword to each of the keywords;

determining whether the semantic class attached to the keyword is a should-be-played class indicating that playback is to be performed after a scene from which the keyword was extracted;

acquiring, in response to the keyword being attached the should-be-played class, at least one keyword as a should-be-observed keyword, wherein the at least one keyword is not attached with the should-be-played class and is from among the keywords to which semantic classes are attached;

determining, in response to the metadata extracted from a scene that is played after a scene from which the should-be-observed keyword is extracted includes the should-be-observed keyword and a keyword to which a should-be-stopped class is attached, wherein the should-be-stopped class is a semantic class that indicates that playback is to be completed, that a scene including the should-be-observed keyword appears in content that is being played; and notifying, in response to the scene including the should-be-observed keyword, that an appearance of the scene that includes the should-be-observed keyword is appearing;

displaying acquired should-be-observed keywords; and receiving designations of the acquired should-be-observed keywords, wherein when the metadata that is extracted from a scene played after the scene from which the should-be-observed keywords are extracted includes a should-be-observed keyword for which the designation is received and the keyword to which the should-be-stopped class is attached, determining that the scene including the should-be-observed keyword appears in the content that is being played.

13. A non-transitory computer-readable recording medium that stores therein a computer program for making a notification with respect to real-time-playing content at a time that a should-be-observed scene actually appears, the computer program causing a computer to execute:

playing a plurality of scenes that are played in time sequence, the scenes being included in content;

extracting metadata from the played scenes, the metadata being text information on the scenes;

extracting keywords from the metadata;

attaching a semantic class indicating a semantic attribute of a keyword to each of the keywords;

determining whether the semantic class attached to the keyword is a should-be-played class that indicates that playback is to be performed after a scene from which the keyword is extracted;

acquiring, in response to the keyword being attached to the should-be-played class, at least one keyword as a should-be-observed keyword, wherein the at least one keyword is not attached with the should-be-played class and is from among the keywords to which semantic classes are attached;

determining, in response to the metadata extracted from a scene that is played after a scene from which the should-be-observed keyword is extracted includes the should-be-observed keyword and a keyword to which a should-be-stopped class has been attached, wherein the should-be-stopped class is a semantic class that indicates that playback is to be completed, that a scene including the should-be-observed keyword appears in content that is being played;

notifying, in response to the scene including the should-be-observed keyword, that an appearance of the scene that includes the should-be-observed keyword is appearing;

displaying acquired should-be-observed keywords; and receiving designations of the acquired should-be-observed keywords, wherein when the metadata that is extracted from a scene played after the scene from which the should-be-observed keywords are extracted includes a should-be-observed keyword for which the designation is received and the keyword to which the should-be-stopped class is attached, determining that the scene including the should-be-observed keyword appears in the content that is being played.

* * * * *